US012730866B2

(12) United States Patent
Cohen et al.

(10) Patent No.: US 12,730,866 B2
(45) Date of Patent: Sep. 8, 2026

(54) ADAPTIVE USER ENROLLMENT FOR ELECTRONIC DEVICES

(71) Applicant: Apple Inc., Cupertino, CA (US)

(72) Inventors: David Cohen, Boulder, CO (US); Kyle C. Brogle, San Francisco, CA (US); Michael J. Rockwell, Palo Alto, CA (US); Ranjit Desai, Cupertino, CA (US); Joel N. Kerr, San Jose, CA (US); Amy E. Dedonato, San Francisco, CA (US); Joaquim Gonçalo Lobo Ferreira Da Silva, San Jose, CA (US); Tyler R. Calderone, Boulder, CO (US); Charilaos Papadopoulos, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 334 days.

(21) Appl. No.: 17/947,070

(22) Filed: Sep. 16, 2022

(65) Prior Publication Data

US 2023/0095816 A1 Mar. 30, 2023

Related U.S. Application Data

(60) Provisional application No. 63/322,640, filed on Mar. 22, 2022, provisional application No. 63/248,411, filed on Sep. 24, 2021.

(51) Int. Cl.
*G06F 21/31* (2013.01)

(52) U.S. Cl.
CPC ............ *G06F 21/316* (2013.01); *G06F 21/31* (2013.01)

(58) Field of Classification Search
CPC ......... G06F 21/316; G06F 21/32; G06F 21/31
See application file for complete search history.

(56) References Cited

U.S. PATENT DOCUMENTS

| | | | |
|---|---|---|---|
| 7,564,369 | B1 | 7/2009 | Adams et al. |
| 9,367,672 | B2 | 6/2016 | Eggerton et al. |

(Continued)

FOREIGN PATENT DOCUMENTS

| | | | |
|---|---|---|---|
| CN | 104903902 | A | 9/2015 |
| CN | 105659243 | A | 6/2016 |

(Continued)

OTHER PUBLICATIONS

Ives, Robert W.; Du, Yingzi; Etter, Delores M.; Welch, Thad B.; "A multidisciplinary approach to biometrics," IEEE Transactions on Education, vol. 48, No. 3, Aug. 31, 2005, pp. 462-471.*

(Continued)

*Primary Examiner* — Victor Lesniewski
(74) *Attorney, Agent, or Firm* — BAKERHOSTETLER

(57) ABSTRACT

Aspects of the subject technology provide electronic devices that operate, in part, based on enrolled user characteristics, and that can be operated by a guest user that has not been enrolled. For example, upon determining that a current user of an electronic device storing a first physical model of a primary user is a guest user different from the primary user, the electronic device may obtain initial physical characteristic data for the guest user and generate a guest physical model of the guest user based on the initial physical characteristic data. In one or more implementations, the electronic device may operate based on guest user inputs and the guest physical model of the guest user, while updating the guest physical model based on the guest user inputs.

25 Claims, 11 Drawing Sheets

(56) References Cited

U.S. PATENT DOCUMENTS 9,646,145 B2 5/2017 Vida et al.
9,703,940 B2 7/2017 Forbes et al.
10,735,412 B2 8/2020 Alsina et al.
11,562,362 B1 * 1/2023 Chang .................... G06Q 20/10
2007/0294540 A1 * 12/2007 Wadayama ...... G06Q 20/40145 713/186
2010/0115610 A1 * 5/2010 Tredoux ................ G06F 21/316 726/19
2010/0144315 A1 * 6/2010 Jayasuriya ............ H04M 1/663 455/411
2010/0182123 A1 * 7/2010 Press ........................ G07C 1/10 340/5.82
2012/0257797 A1 * 10/2012 Leyvand ................. A63F 13/40 382/118
2013/0097416 A1 * 4/2013 Barra ...................... G06F 21/32 713/100
2014/0075528 A1 * 3/2014 Matsuoka ............. H04L 63/102 726/7
2014/0226131 A1 * 8/2014 Lopez ..................... G06F 21/31 351/210
2015/0113631 A1 * 4/2015 Lerner .................... G06F 21/53 726/16
2015/0137937 A1 * 5/2015 Smith ...................... G07C 9/37 340/5.52
2015/0355915 A1 * 12/2015 Sipe ........................ G06F 21/32 713/100
2016/0085564 A1 * 3/2016 Arcese ................ H04L 63/0861 726/7
2016/0182502 A1 * 6/2016 Smith ................. H04L 63/0884 726/7
2017/0024229 A1 * 1/2017 Chatterton .............. G06F 21/31
2019/0116094 A1 4/2019 Vida et al.
2019/0143943 A1 * 5/2019 Lee ......................... G06F 21/32 340/426.13
2020/0053077 A1 * 2/2020 Merrell ............ G06Q 20/40145
2020/0159387 A1 5/2020 Schoenfelder et al.
2020/0233202 A1 * 7/2020 Derakhshani .......... G01B 11/25
2021/0243186 A1 * 8/2021 Tormasov ............... G06F 21/32
2021/0326421 A1 * 10/2021 Khoury ................... G10L 17/08
2022/0358197 A1 * 11/2022 Wang ................. G06V 40/1318
2022/0366819 A1 * 11/2022 Gao ........................ G09G 3/003
2023/0273447 A1 * 8/2023 Zhou .................. G02B 26/0875 345/156

FOREIGN PATENT DOCUMENTS

CN 109478288 A 3/2019
CN 111310019 A 6/2020
CN 113168274 A 7/2021
CN 113330452 B 6/2024
KR 2018-0136982 A 12/2018
KR 2021-0091280 A 7/2021
WO WO 2021/173789 9/2021

OTHER PUBLICATIONS

Korean Office Action from Korean Patent Application No. 10-2022-0120089, dated Apr. 9, 2024, 17 pages including English language translation.
Korean Office Action from 10-2022-0120089, dated Dec. 27, 2024, 15 pages with English language translation.
Indian Patent Application No. 202214054618, Office Action dated May 21, 2025, 8 pages with translation.
Korean Patent Application No. 10-2022-0120089, Written Decision on Registration dated Sep. 25, 2025, 10 pages including machine translation.
Chinese Office Action in Patent Application No. 202211167873.2 dated Jun. 11, 2026 in 43 pages.

* cited by examiner

ADAPTIVE USER ENROLLMENT FOR ELECTRONIC DEVICES

CROSS REFERENCE TO RELATED APPLICATIONS

This application claims the benefit of priority to U.S. Provisional Patent Application No. 63/248,411, entitled, "Adaptive User Enrollment for Electronic Devices", filed on Sep. 24, 2021, and U.S. Provisional Patent Application No. 63/322,640, entitled, "Adaptive User Enrollment for Electronic Devices", filed on Mar. 22, 2022, the disclosure of each which is hereby incorporated herein in its entirety.

TECHNICAL FIELD

The present description relates generally to electronic devices including, for example, adaptive user enrollment for electronic devices.

BACKGROUND

Electronic devices, such as smartphones, laptop computers, tablet computers, desktop computers, and the like, typically have a primary user, such as an owner of the device. A primary user is typically logged into a primary user account on the electronic device. A primary user of these electronic devices can share the electronic device with another person simply by allowing the other person to physically interact with the electronic device, perhaps first unlocking the electronic device in some cases.

BRIEF DESCRIPTION OF THE DRAWINGS

Certain features of the subject technology are set forth in the appended claims. However, for purpose of explanation, several implementations of the subject technology are set forth in the following figures.

DETAILED DESCRIPTION

Figure 1:
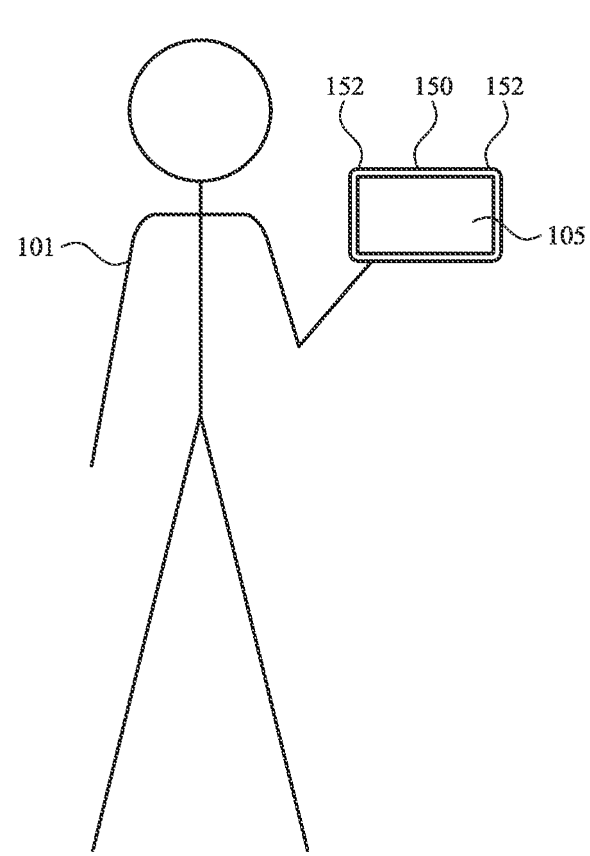
FIG. 1 illustrates an example electronic device of a primary user in accordance with one or more implementations.
Figure 1:
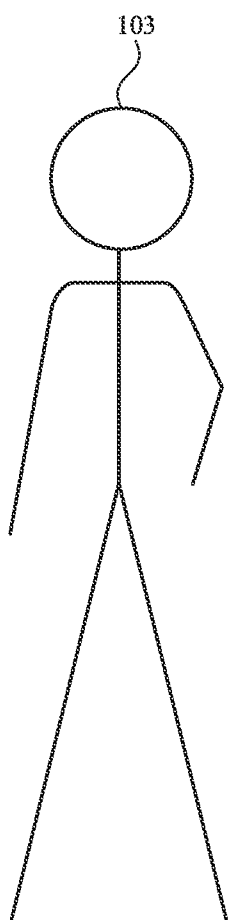

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Implementations of the subject technology described herein can provide guest user access to an electronic device, of another user, that operates based on a user-specific model of a user. For example, an electronic device that operates based on a user-specific model of a user may be an electronic device that receives and interprets gesture inputs based on a user-specific model corresponding to physical attributes of a user, such as attributes of a user's hands and/or arms, and/or an electronic device that outputs display content based on a user-specific model corresponding to the user's eye position (s) and/or movements. Thus, the user-specific model may include one or more parameters, measurements, etc. that correspond to and/or describe physical attributes of the user, e.g., arm length, finger length, height, interpupillary distance, etc.

For an electronic device that operates based on a user-specific model, a primary user of the device may interact with the electronic device during enrollment operations that allow the device to build the user-specific model of the primary user. Enrollment operations may include instructing the primary user to perform one or more hand gestures, eye movements, facial expressions, etc. while one or more sensors and/or one or more cameras of the device obtain inputs. The enrollment operations may also include generating a user-specific model of the physical attributes of the primary user based on the inputs.

Once generated, the user-specific model of the primary user may be used by the device to interpret user inputs (e.g., user hand gestures or other movements, and/or user eye tracking inputs), and to provide outputs to the primary user (e.g., to generate three-dimensional audio and/or visual outputs). Because the inputs and/or the outputs of the device can be user-specific (e.g., based on the user-specific model), a guest user attempting to use the device of the primary user may have difficulty providing inputs to the device and/or viewing and/or hearing outputs from the device.

In one or more implementations, in order to allow the guest user to effectively operate the device, without having to perform the full enrollment operations previously performed by the primary user, the electronic device may adapt to perform an initial (e.g., coarse) enrollment of the guest user, and then refine the enrollment of the guest user based on ongoing guest user inputs and/or information corresponding to the guest user that is captured during normal operation of the device (e.g., operation of the device that is not part of an enrollment process). In one or more implementations, an initial (e.g., coarse) enrollment, as described herein, can also be used for a primary user of the device when the enrolled physical model of the primary user is unavailable. For example, at boot time in an implementation in which the enrolled physical model of the primary user is not available until after a passcode is entered, the initial enrollment may be used to allow the primary user to enter the passcode based on a temporary initial physical model for the primary user.

FIG. 1 illustrates an example electronic device 105 of a primary user 101. The electronic device 105 may be smartphone, a tablet device, another portable electronic device, or a wearable device such as a wrist mountable device or a head mountable portable system, that includes a display system capable of presenting a visualization of an extended reality environment to a user. For example, the electronic device 105 may generate and store a physical model of the primary user 101, and interpret user inputs from the primary user 101 and generate outputs for the primary user 101, based on that physical model of the primary user 101.

The electronic device 105 may be powered with a battery and/or any other power supply. In an example, the display system of the electronic device 105 provides a stereoscopic presentation of the extended reality environment, enabling a three-dimensional visual display of a rendering of a particular scene, to the user.

The electronic device 105 may include one or more cameras such as camera(s) 150 (e.g., visible light cameras, infrared cameras, eye tracking cameras, etc.) Further, the electronic device 105 may include various sensors, such as sensor(s) 152. Sensor(s) 152 may include, but are not limited to, cameras, image sensors, touch sensors, depth sensors, microphones, inertial measurement units (IMU), heart rate sensors, temperature sensors, Lidar sensors, radar sensors, sonar sensors, GPS sensors, Wi-Fi sensors, near-field communications sensors, etc.) Moreover, the electronic device 105 may include hardware elements that can receive user input such as hardware buttons or switches. User input detected by such camera, sensors, and/or other hardware elements correspond to various input modalities for interacting with virtual content displayed within a given extended reality environment. For example, such input modalities may include, but are not limited to, facial tracking, eye tracking (e.g., gaze direction tracking), hand tracking, gesture tracking, biometric readings (e.g., heart rate, pulse, pupil dilation, ocular characteristics, breath, temperature, electroencephalogram, olfactory), recognizing speech or audio (e.g., particular hotwords), and activating buttons or switches, etc. The electronic device 105 may also detect and/or classify physical objects in the physical environment of the electronic device 105.

In one or more implementations, the electronic device 105 may be communicatively coupled to a base device. Such a base device may, in general, include more computing resources and/or available power in comparison with the electronic device 105. In an example, the electronic device 105 may operate in various modes. For instance, the electronic device 105 can operate in a standalone mode independent of any base device. The electronic device 105 may also operate in a wireless tethered mode (e.g., connected via a wireless connection with a base device), working in conjunction with a given base device. The electronic device 105 may also work in a connected mode where the electronic device 105 is physically connected to a base device (e.g., via a cable or some other physical connector) and may utilize power resources provided by the base device (e.g., where the base device is charging the electronic device 105 while physically connected).

When the electronic device 105 operates in the wireless tethered mode or the connected mode, a least a portion of processing user inputs and/or rendering the extended reality environment may be offloaded to the base device thereby reducing processing burdens on the electronic device 105. For instance, in an implementation, the electronic device 105 operates, based in part on a model of the primary user 101, to generate an extended reality environment including physical and/or virtual objects that enables different forms of interaction (e.g., visual, auditory, and/or physical or tactile interaction) between the user and the extended reality environment in a real-time manner. In an example, the electronic device 105 provides a rendering of a scene corresponding to the extended reality environment that can be perceived by the user and interacted with in a real-time manner. Additionally, as part of presenting the rendered scene, the electronic device 105 may provide sound, and/or haptic or tactile feedback to the user.

The electronic device 105 may also detect events that have occurred within the scene of the extended reality environment. Examples of such events include detecting a presence of a particular person, entity, or object in the scene. Detected physical objects may be classified by electronic device 105, and the location, position, size, dimensions, shape, and/or other characteristics of the physical objects can be used to provide physical anchor objects for an XR application generating virtual content, such as a UI of an application, for display within the XR environment. It is further appreciated that electronic devices other than the electronic device 105 can also generate such extended reality environments based, in part, on a user-specific model of a user.

In one or more implementations, a network may communicatively (directly or indirectly) couple, for example, the electronic device 105 to one or more electronic devices of one or more other users. In one or more implementations, the network may be an interconnected network of devices that may include, or may be communicatively coupled to, the Internet.

Figure 2:
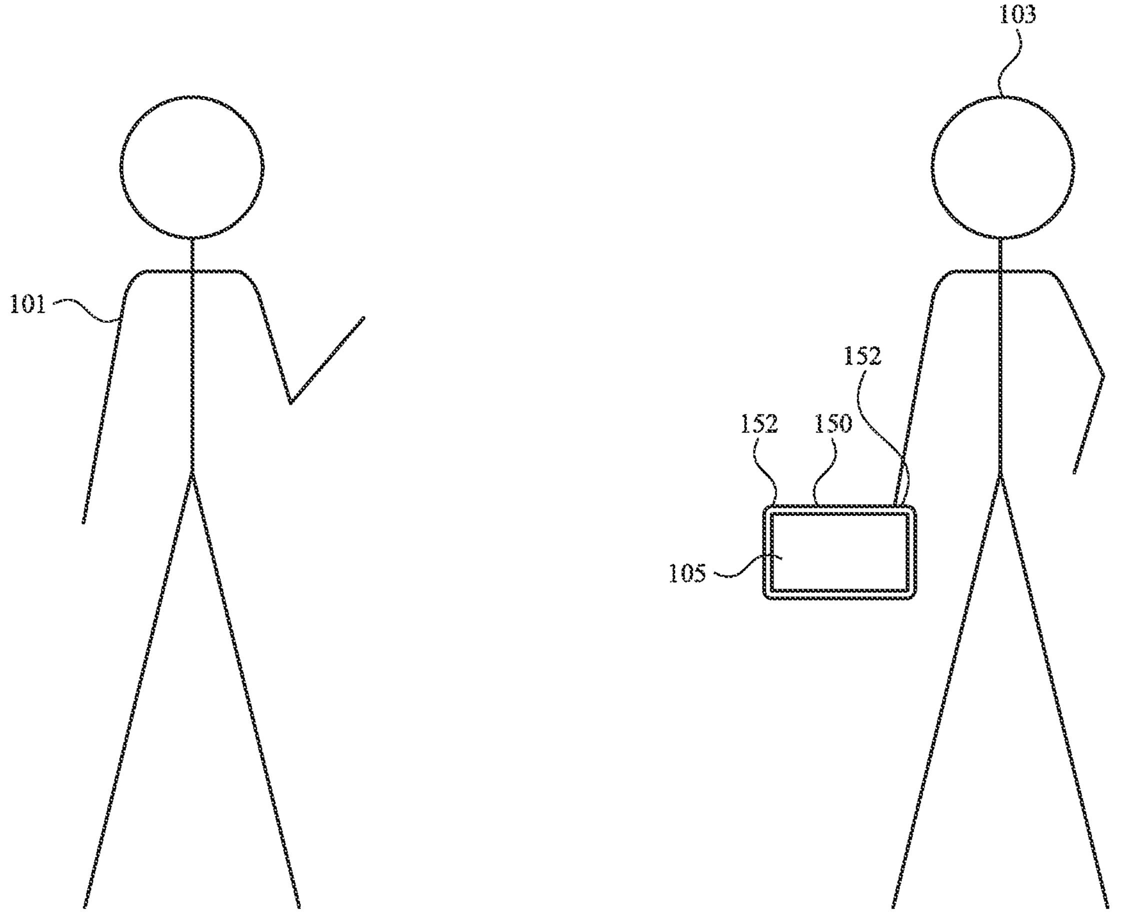
FIG. 2 illustrates an example of a guest user operating an electronic device of a primary user in accordance with one or more implementations.

In one or more use cases, the primary user 101 may want to share the electronic device 105 with one or more other users, such as user 103. For example, the primary user 101 may be viewing content using the electronic device that the primary user 101 would like the user 103 to see. In another example, the primary user 101 may be playing a game on the electronic device 105, and may want to allow the user 103 to take a turn playing the game. In another example, the primary user 101 may want to allow the user 103 to access their own content via the electronic device (e.g., via a web browser or another application on the electronic device 105). As illustrated in FIG. 2, the primary user 101 may hand the electronic device 105 over to the user 103.

However, because the electronic device may operate (e.g., to interpret user inputs and/or generate outputs such as audio, video, and/or haptic outputs) based on a user-specific model of the primary user (e.g., including a model of the user's eye locations and/or positions and/or the user's hands, arms, and/or other physical characteristics), the electronic device 105 may function inefficiently or incorrectly if the user 103 attempts to operate the electronic device 105 while the user-specific model of the primary user 101 is active. For example, the electronic device 105 may incorrectly determine a gaze location of the user 103 if the gaze location is determined based on the user-specific model of primary user 101. Device operations that are based on the determined gaze location could then be performed incorrectly due to the incorrect gaze location. As another example, the electronic device 105 may display content at one or more locations on a display of the device that are determined, based on the user-specific model of the primary user 101, to cause the display content to appear at particular corresponding locations to the user of the electronic device. However, because the locations on a display of the device are determined based on the user-specific model of the primary user 101, the display content may appear to the user 103 differently than intended by the device (e.g., at an incorrect three-dimensional depth, or out of focus).

One option to allow the user 103 to operate the electronic device 105 would be for the user 103 to go through the same enrollment process as the primary user 101 and add a user account to the electronic device 105, so that a model of the user 103 can be generated and used for operation of the electronic device 105 when the user account of the user 103 is selected as the current user account. However, a full enrollment of the user 103 can have drawbacks, such as an undesirable delay before the user 103 can begin using the electronic device 105 (e.g., in use cases in which the primary user 101 wishes to share time-sensitive content with the user 103 via the electronic device 105). Moreover, the primary user 101 and/or the user 103 may not desire to have user-specific information for the user 103 persistently stored at the electronic device (e.g., in an account for that user).

Aspects of the subject technology can reduce or eliminate these drawbacks by, for example, performing a quick or light initial enrollment of the user 103, using less enrollment data than was collected to generate the user-specific model of the primary user 101, to generate an initial guest user-specific model for the user 103. This initial guest user-specific model for the user 103 allows the user 103 to immediately being using the electronic device 105. In one or more implementations, while the user 103 operates the electronic device 105 based on the guest user-specific model, the information obtained by the sensor(s) 152 and camera(s) 150, including physical characteristic data for the user 103 during operation of the device, may be used to update the initial guest user-specific model for the user 103 (e.g., on an ongoing basis) during operation of the device.

Figure 3:
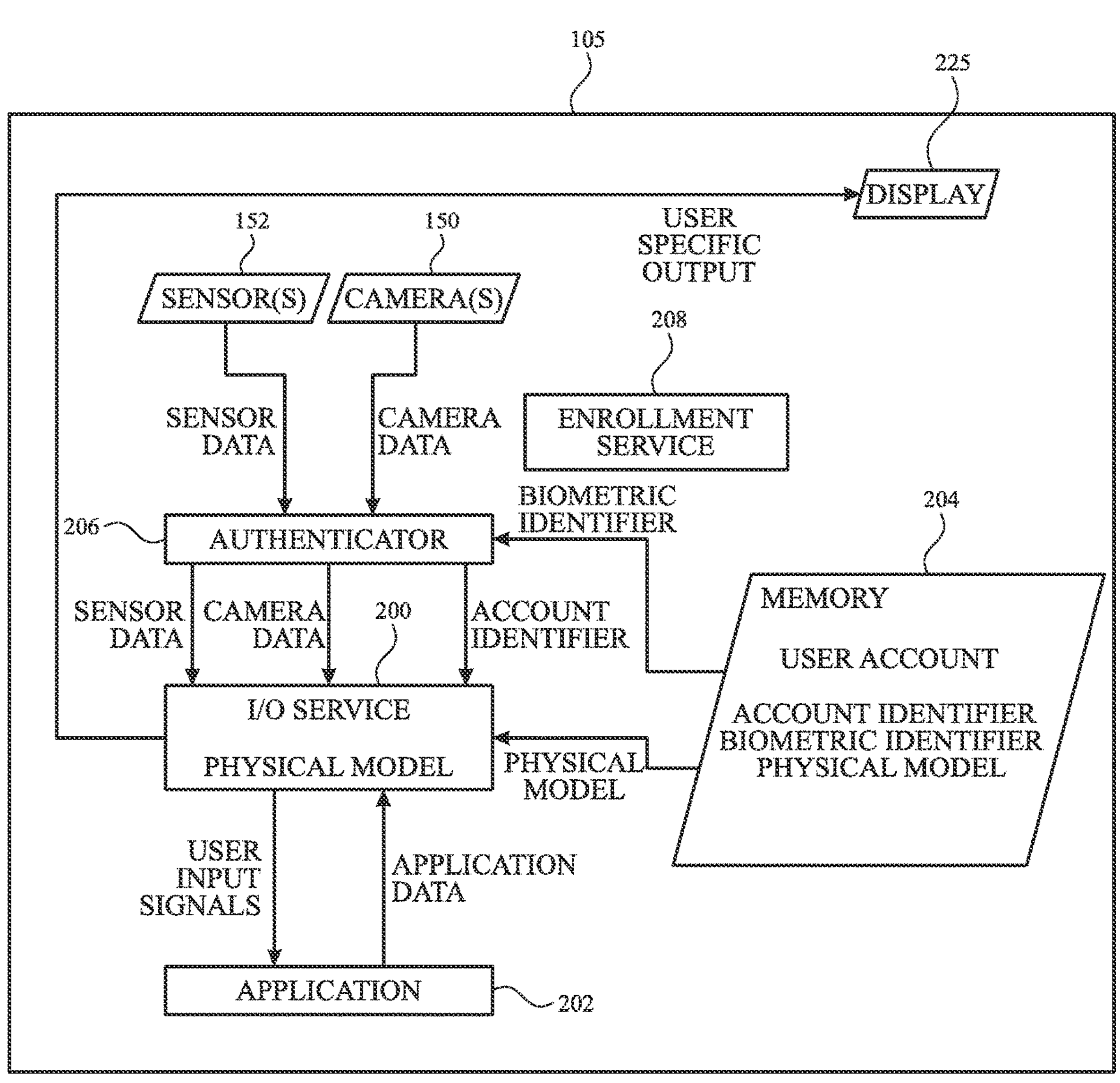
FIG. 3 illustrates an example architecture of an electronic device being operated by a primary user in accordance with one or more implementations.

FIG. 3 illustrates an example architecture that may be implemented by the electronic device 105 in accordance with one or more implementations of the subject technology. For explanatory purposes, portions of the architecture of FIG. 3 are described as being implemented by the electronic device 105 of FIG. 1, such as by a processor and/or memory of the electronic device; however, appropriate portions of the architecture may be implemented by any other electronic device. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

Various portions of the architecture of FIG. 3 can be implemented in software or hardware, including by one or more processors and a memory device containing instructions, which when executed by the processor cause the processor to perform the operations described herein. For example, in FIG. 3, the trapezoidal boxes may indicate that the sensor(s) 152, the camera(s) 150, the memory 204, and the display 225 may be hardware components, and the rectangular boxes may indicate that an I/O service 200, one or more applications 202, an authenticator 206, and an enrollment service 208 may be implemented in software, including by one or more processors and a memory device containing instructions, which when executed by the processor cause the processor to perform the operations described herein.

The example of FIG. 3 illustrates the electronic device 105 operating an application 202 for a primary user, such as the primary user 101 of FIG. 1. As shown in FIG. 3, memory 204 of the electronic device 105 may store a user account of a primary user such as the primary user 101 of FIG. 1. As shown, the memory 204 may store an account identifier of the user account of the primary user, a biometric identifier of the primary user, and a physical model of the primary user (e.g., a user-specific model of one or more physical attributes of the primary user). The biometric identifier may correspond to a fingerprint, a facial identifier, an image of a portion of the user's eye, a voice signature, or any other biometric feature that is unique to the primary user, and may be stored in encrypted form in the memory 204.

In the example of FIG. 3, sensor data from the sensor(s) 152 and camera data from the camera(s) 150 is provided to an authenticator 206. The authenticator 206 may obtain (e.g., based on or directly from the sensor data and/or the camera data) a biometric input for a current user of the electronic device during operation of the electronic device 105. For example, the biometric input may be an image or a sensor map of the current user's fingerprint, an image or a sensor map of a facial identifier of the current user, an image or a sensor map of a portion of the user's eye, or any other biometric sensor and/or camera data that can be compared with the (previously stored) biometric identifier of the primary user. In the example of FIG. 3, the authenticator 206 obtains the biometric identifier of the primary user from the memory 204 and determines, by comparing the biometric input from the current user to the biometric identifier of the user account of the primary user, that the current user is the primary user. In this example, the authenticator 206 may obtain, based on the determination that the current user in the primary user, the account identifier for the user account of the primary user, and may provide the account identifier to the I/O service 200.

As illustrated in FIG. 3, the I/O service 200 may obtain (e.g., using the account identifier received from the authenticator 206), the physical model from the user account of the primary user, and the authenticator may pass the sensor data and/or the camera data (e.g., or otherwise permit the sensor data and/or the camera data to pass) to the I/O service 200. As illustrated in FIG. 3, when the primary user is the current user (e.g., as authenticated by the authenticator 206), the I/O service 200 may interpret the sensor data and/or the camera data, using the physical model of the primary user, to generate user input signals from the primary user. For example, the user input signals may indicate a gaze location of the user's gaze, determined from the camera data and/or the sensor data as interpreted based on features of the primary user's eye(s) in the user-specific model of the physical attributes of the primary user (e.g., the physical model). As another example, the user input signals may indicate a hand gesture determined from the camera data and/or the sensor data as interpreted based on features of the primary user's hands and/or arms in the physical model The I/O service 200 can perform operations based on the user input signals (e.g., to control output of system content) and/or provide the user input signals to the application 202.

In the example of FIG. 3, the user input signals are provided to the application 202, and the application 202 (e.g., responsive to the user input signals) provides application data to the I/O service 200. The application data may include, for example, content for inclusion in a user interface of the application 202 and/or instructions for how and/or when to render the content. As shown, the I/O service 200 may then generate user-specific output based on the application data and the physical model of the primary user. In this example, the user-specific output may include display content (e.g., rendered display frames) in which the display content is positioned on the display based on the physical model of the primary user. For example, the display content may be displayed in left and right eye display frames at locations that cause the display content to appear at a desired three-dimensional depth to the primary user, based on an interpupillary distance, or other eye characteristic information of the primary user in the physical model. As another example, the resolution and/or the focus of the display content may be adjusted based on a gaze location determined using the physical model of the primary user.

Figure 4:
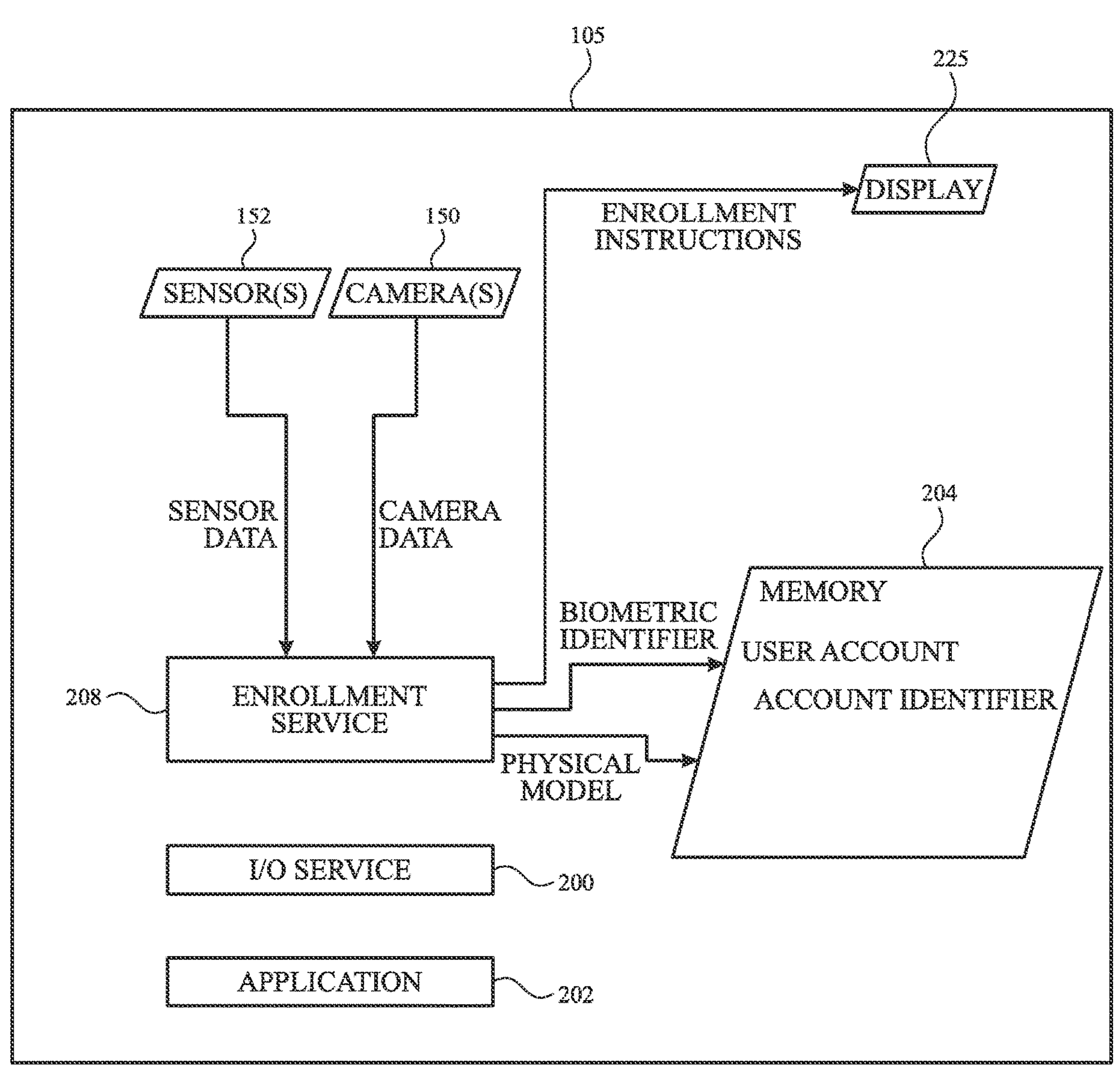
FIG. 4 illustrates an example architecture of an electronic device performing an enrollment operation for a primary user in accordance with one or more implementations.

In order to allow the electronic device 105 to operate using the physical model of the primary user as illustrated in the example of FIG. 3, the electronic device 105 may first perform an enrollment process for the primary user, to generate the biometric identifier and the physical model for the primary user. FIG. 4 illustrates the example architecture for the electronic device 105 performing an enrollment operation for a primary user, such as the primary user 101 of FIG. 1. The enrollment operation illustrated by FIG. 4 can be performed prior to the operations illustrated by FIG. 3.

As shown in FIG. 4, the enrollment service 208 may generate enrollment instructions for output to an enrolling user. In this example, the enrollment instructions are provided for display by the display 225. However, the enrollment instructions can be audio enrollment instructions or may be provided any suitable form to an enrolling user. For example, the enrollment instructions may include instructions to perform a set of eye movements, such as instructions to a user to follow a displayed indicator with their gaze. As the user follows the displayed indicator with their gaze, the sensor(s) 152 and/or the camera(s) 150 may generate and provide sensor data and/or camera data (e.g., including images and/or other mapping data for the user's eyes at various positions) to the enrollment service 208. Based, for example, on the known displayed locations of the displayed indicator, the enrollment service 208 can extract physical characteristic data corresponding to the eyes of primary user from the sensor data and/or the camera data. The enrollment service 208 can build a model of the user's eyes, based on the physical characteristic data, that can be later user to track the user's gaze for operation of the electronic device 105. As another example, the enrollment instructions may include instructions to perform a set of hand gestures. As the user performs the instructed hand gestures, the sensor(s) 152 and/or the camera(s) 150 may generate and provide sensor data and/or camera data (e.g., images, Lidar data, and/or depth mapping information) to the enrollment service 208. Based, for example, on the known gestures instructed to the user, the enrollment service 208 may extract additional physical characteristic data corresponding to the user's hands, arms, fingers, and/or movement characteristics (as examples) from the sensor data and/or the camera data, and can build a model of the hands, arms, and/or gesture characteristics of that particular user using the additional physical characteristic data, for later operation of the electronic device 105 using gesture inputs.

The enrollment service 208 may also obtain, based on or directly from the sensor data and/or the camera data, a biometric identifier of the primary user. For example, the enrollment service 208 may obtain and encode/encrypt for secure storage, an image of a fingerprint, a depth map of a user's face, an image of a portion of the primary user's eye, and/or any other suitable biometric data, as the biometric identifier of the primary user. As shown, the enrollment service 208 may provide the biometric identifier and the physical model to the memory 204 for secure storage in connection with the user account of the primary user, and for subsequent operation of the electronic device 105 (e.g., as discussed above in connection with FIG. 3).

Figure 5:
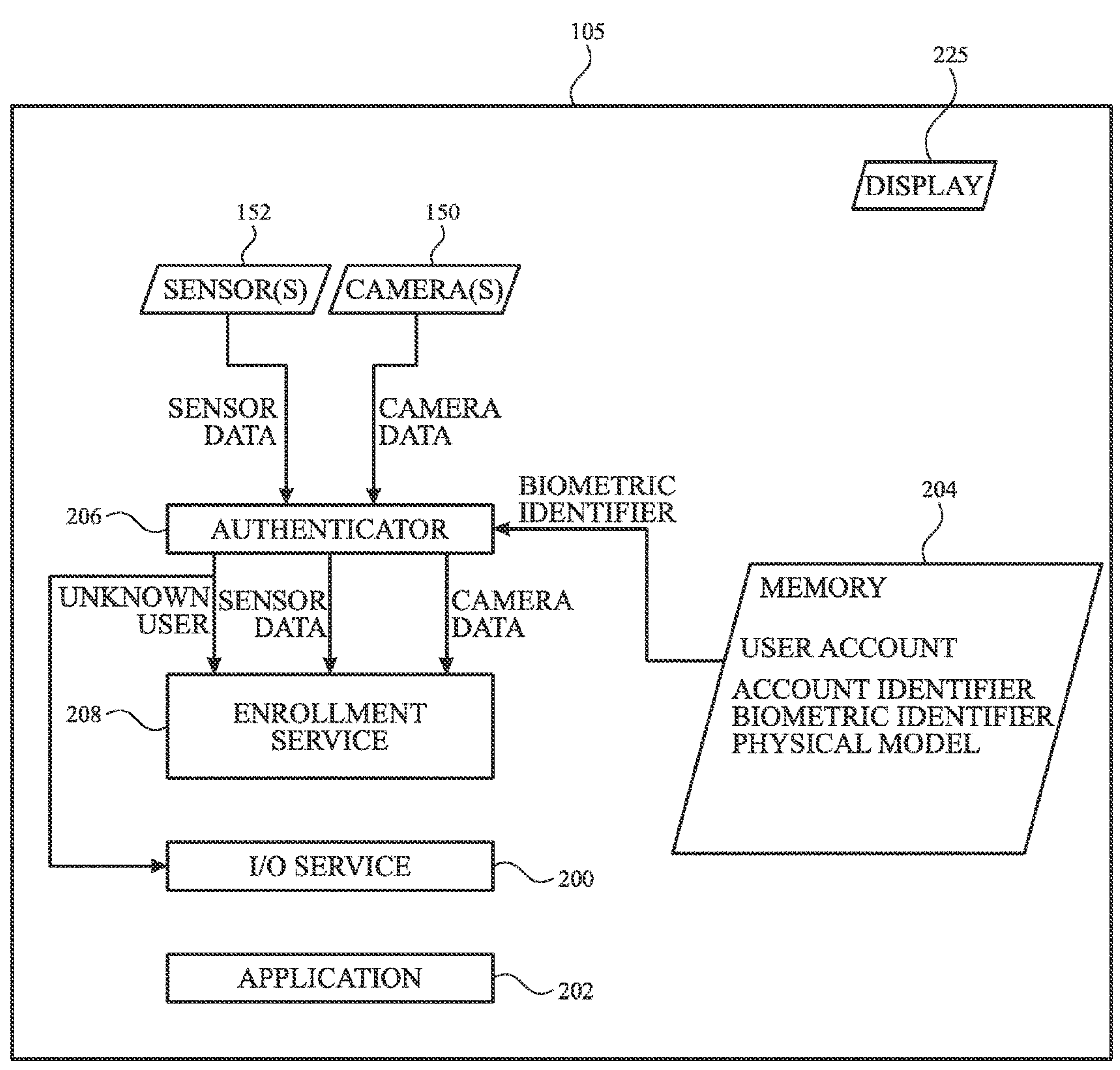
FIG. 5 illustrates an example architecture of an electronic device detecting a current user other than a primary user in accordance with one or more implementations.

As discussed herein, the primary user may, in some use cases, allow another user (e.g., a guest user) to operate the electronic device 105. FIG. 5 illustrates the electronic device 105 operating at a time when a current user is a guest user different from the primary user, such as the user 103 of FIG. 1. As illustrated in FIG. 5, based on the sensor data and/or the camera data (e.g., including images and/or other sensor data corresponding to the face, fingerprint, eyes, etc. of the current user), when a guest user different from the primary user begins using the electronic device 105, the authenticator 206 may (e.g., based on a comparison of a biometric input corresponding to the sensor data and/or the camera data with the biometric identifier of the primary user) determine that the current user is an unknown user (e.g., a user other than the primary user or any other enrolled user of the electronic device 105).

As an example, the authenticator 206 may determine that the current user is a guest user different from the primary user by detecting an authentication failure due to an eye model mismatch, an iris mismatch, an unexpected hand location position, an inferred user height, another biometric authentication failure, and/or due to unexpected user activity. For example, with respect to unexpected user activity, the electronic device 105 may determine that a gaze point of the current user is at or near a UI element, having one or more touch elements, that is displayed by the display 225, and that the current user is repeatedly providing hand gestures at a location away from any of the displayed touch elements. This unexpected user activity may indicate that the physical model being used to interpret gaze locations and/or hand gestures is inconsistent with the current user. This may indicate to the electronic device that the current user is a guest user other than the primary user (although it is also appreciated that, in one or more use cases, unexpected user activity may occur even when the primary user is using the device, such as in the case of an out-of-date enrollment, such as is as described in further detail hereinafter in connection with FIG. 9).

In one or more implementations, the electronic device 105 (e.g., the authenticator 206) may lock the electronic device 105 from user interactions when an authentication failure and/or unexpected user activity is detected. In one or more implementations, the electronic device 105 may lock the electronic device 105 from user interactions other than passcode entry, without locking the filesystem of the device for a period of time after an authentication failure and/or unexpected user activity is detected. For example, the electronic device 105 may, responsive to detecting an authentication failure and/or unexpected user activity, provide a prompt to the user to enter a passcode of the primary user. In one or more implementations, a guest option (e.g., a virtual "guest" button or a guest button prompt associated with a hardware button) may also be provided with the passcode prompt (e.g., if a time since the primary user was using the electronic device is less than a threshold time). In one or more implementations, a selection of the guest option may indicate to the electronic device 105 (e.g., to the authenticator 206) that the current user is a guest user different from the primary user. In one or more implementations, if a time since the primary user was using the electronic device is greater than a threshold time (e.g., and a guest option has not been selected and a passcode or successful biometric authentication has not been provided), the electronic device 105 may prevent use of the device by any user without primary user authentication (e.g., biometric authentication and/or passcode entry).

It is also appreciated that the authenticator 206 may also determine that the current user is a guest user different from the primary user using non-biometric feedback. In one example, the electronic device 105 may receive user input (e.g., from the primary user prior to passing the electronic device to a guest user, or from a guest user) indicating a guest user is using or is about to be using the device.

Responsively to determining that the current user is a guest user different from the primary user, the authenticator 206 may provide an indication to the enrollment service 208 and/or the I/O service 200 that the user is an unknown user, and may (e.g., rather than providing or permitting the sensor data and/or the camera data from being provided solely or directly to the I/O service 200) cause the sensor data and/or the camera data to be provided or redirected to the enrollment service 208. As indicated, the physical model of the primary user may be deactivated (e.g., by the I/O service 200) responsive to the detection of the unknown user. It is also appreciated that the guest user can be detected by the electronic device in other ways, such as an explicit user input indicating a switch from the primary user to a guest user.

Figure 6:
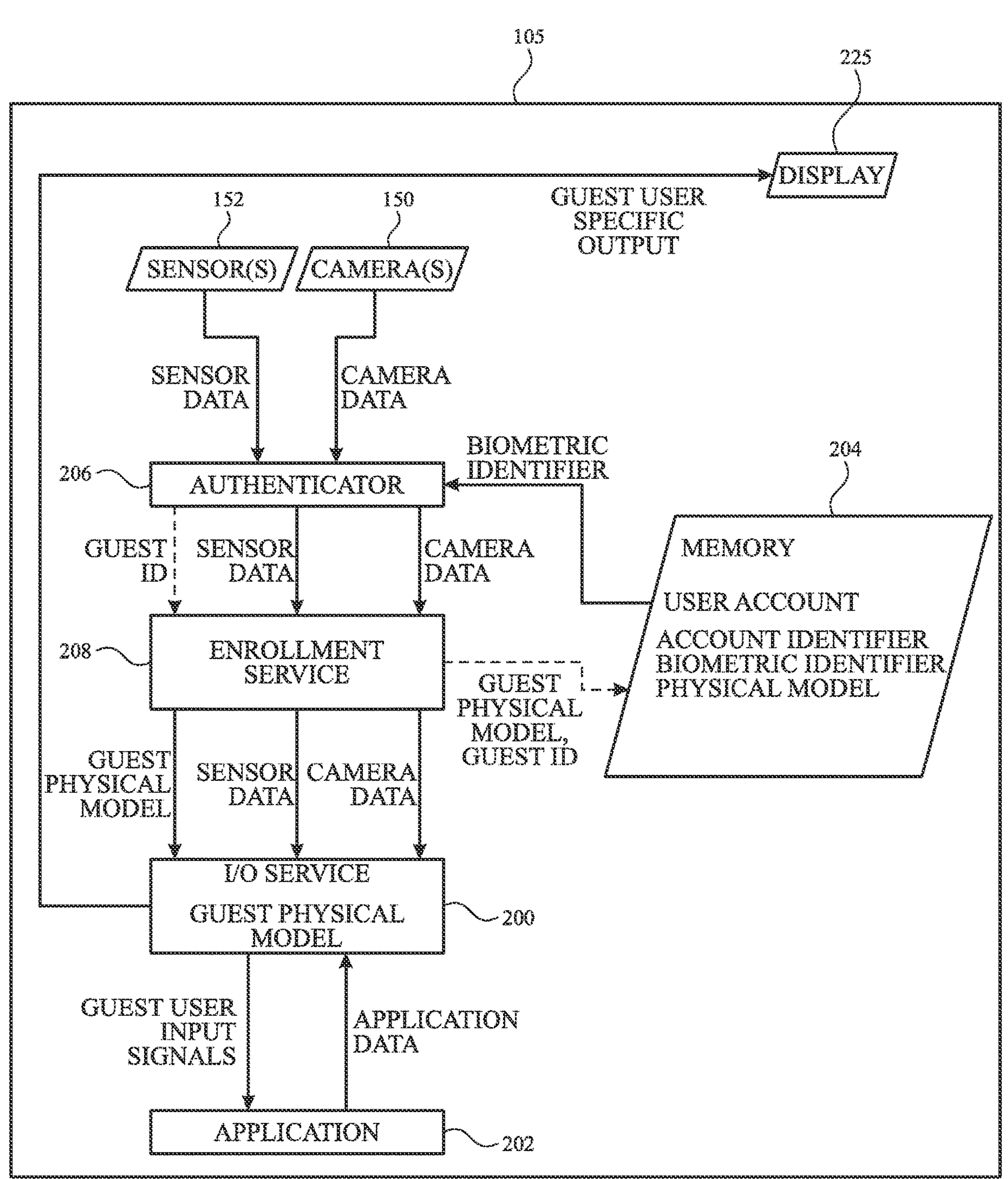
FIG. 6 illustrates an example architecture of an electronic device being operated by a guest user in accordance with one or more implementations.

As shown in FIG. 6, in one or more implementations, the enrollment service 208 (e.g., without providing any enrollment instructions to the current user or by providing a reduced set of enrollment instructions relative to the enrollment instructions that were provided to the primary user as described in connection with FIG. 4), may then extract initial physical characteristic data from the sensor data and/or the camera data. The enrollment service 208 can generate, from the initial physical characteristic data, an initial guest physical model (e.g., an initial guest user-specific model of physical attributes of the guest user) for the guest user (e.g., using an amount of physical characteristic data and/or other enrollment data and/or that is less than the amount of physical characteristic data and/or other enrollment data used to generate the physical model of the primary user). For example, the primary user may be instructed to direct their gaze to three, four, or more than four locations during the enrollment operation illustrated by FIG. 4, and the initial guest user physical model may be generated based on a single gaze location (e.g., which the user gazes on based on an explicit instruction from the electronic device, or that the electronic device assumes the user gazes on when an indicator, such as a localized flash of light, at the single gaze location, is displayed). As another example, in the enrollment process of FIG. 4, the enrolling user may be instructed to perform a set of hand gestures during which image data and/or sensor data corresponding to the user's hand while making the gestures is obtained. In contrast, for the guest user, the sensor(s) 152 and/or the camera(s) 150 may capture data corresponding to the user's hand without providing any gesture instructions to the user or by instructing or visually inducing the guest user to perform a single gesture or a reduced set of gestures.

As shown in FIG. 6, the enrollment service 208 may provide the guest physical model (e.g., directly) to the I/O service 200, so that the electronic device 105 can immediately begin operating based on this initial guest physical model (e.g., by interpreting guest user inputs to generate guest user input signals and/or generating guest user specific outputs, based on the guest physical model). In this way, the guest user can be provided with the ability to immediately begin using the electronic device 105 (e.g., without performing a full enrollment process).

As shown, the enrollment service 208 may also, optionally, generate a temporary guest user identifier (guest ID) that can be provided to the enrollment service 208 and/or be (e.g., temporarily) stored in the memory 204 with the guest physical model while the electronic device 105 is in use by the guest user (e.g., user 103), in one or more implementations.

Figure 7:
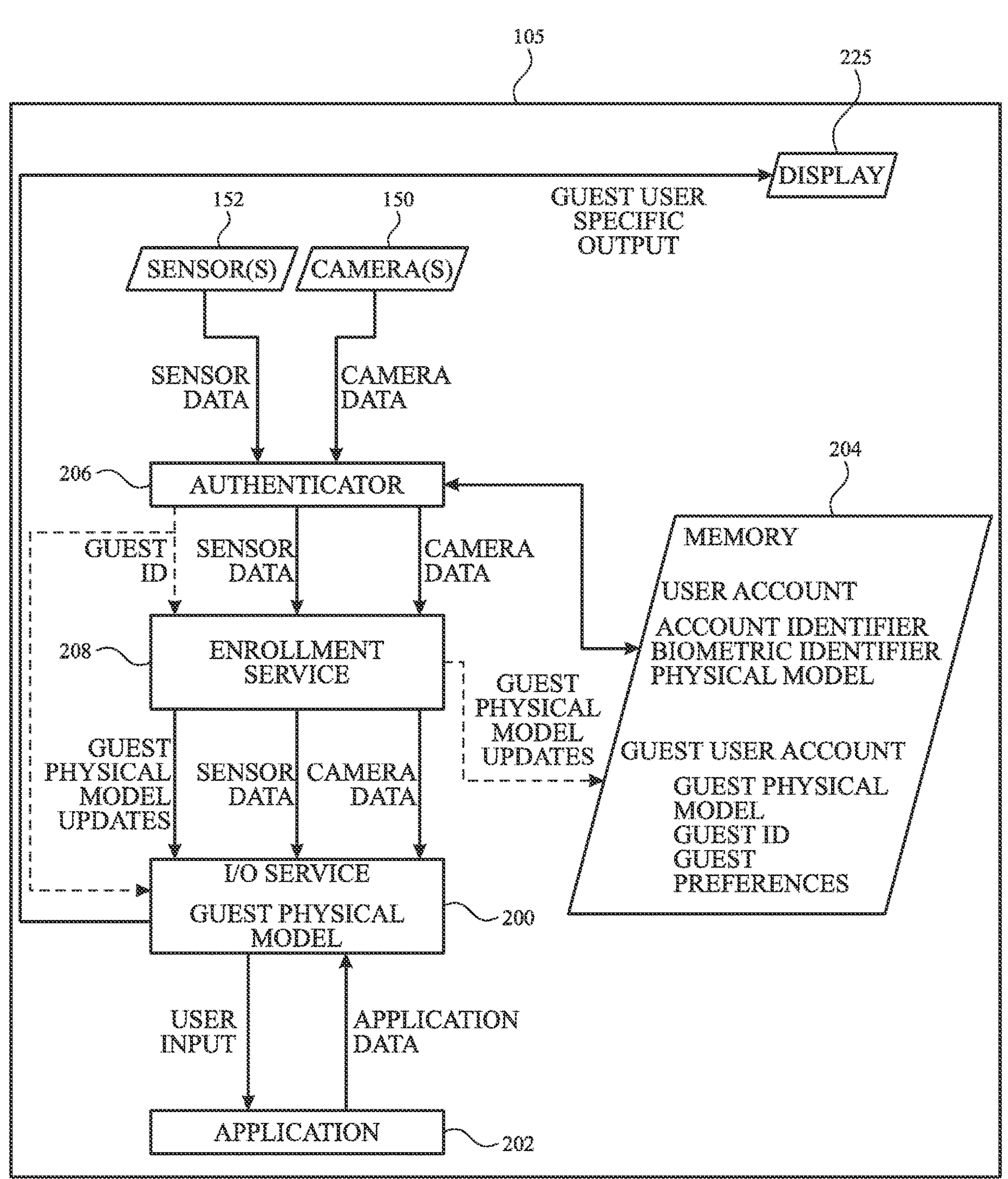
FIG. 7 illustrates an example architecture of an electronic device updating a guest physical model while being operated by a guest user in accordance with one or more implementations.

In one or more implementations, the electronic device 105 may update the guest physical model of the guest user while the guest user continues to operate the electronic device 105 based on the guest physical model. FIG. 7 illustrates the electronic device 105 updating the guest physical model while operating based on guest user inputs and the guest physical model.

As shown in FIG. 7, while the I/O service 200 receives sensor data and/or camera data corresponding to guest user inputs for operating the electronic device 105, generates and provides guest user input signals to application 202 based on the guest physical model, and/or generates and provides guest user specific outputs based on application data and the guest physical model, the enrollment service 208 may generate guest physical model updates. As shown, the guest physical model updates (e.g., the guest physical model with the updates, or updates that can be applied to the prior guest physical model by the I/O service 200) may be provided to the I/O service 200. The I/O service 200 may then interpret subsequent guest user inputs and generate subsequent guest user specific outputs based on the updated guest physical model.

For example, the guest user may provide guest user inputs to the electronic device 105, such as by moving their eyes to gaze on a particular portion of display content displayed by the display 225 while operating the electronic device 105. For example, the user may gaze on a user interface of the application 202 or an element thereof. In one or more implementations, the I/O service may operate, based on the guest user's gaze location, to enhance a display brightness or resolution of that user interface or that portion thereof. The guest user may then provide other/additional guest user inputs, such as by performing a hand gesture to select the user interface or the portion thereof. The enrollment service 208 can extract additional physical characteristic data from these guest user inputs, and can update the guest physical model based on the additional physical characteristic data extracted from these guest user inputs that occur during the operation of the electronic device (e.g., and not during an enrollment operation). For example, the enrollment service 208 may use the user's selection of the user interface or the portion thereof as confirmation of the estimated gaze location. The enrollment service 208 can then use the sensor data and/or camera data from which the gaze location was determined as additional physical characteristic data for the guest user, based on this confirmation. Images and/or sensor data that capture the user's hand gesture can also be extracted as additional user characteristic data from which the guest physical model can be updated. In another example, the enrollment service 208 can infer the height of the guest user by detecting known visual markers in the physical environment as the guest user moves and/or looks around the physical environment, and using three-dimensional positioning operations.

In various implementations, the enrollment service 208 may continue updating the guest physical model as long as the guest user continues to use the device, intermittently while the guest user operates the device, or until the enrollment service 208 determines that the guest physical model has converged to a stable model (e.g., by determining that the updates are no longer changing the guest physical model in a way that affects the operation of the electronic device). In one or more implementations, operating the electronic device, based on the updated guest physical model of the guest user as illustrated in FIG. 7, can provide enhanced device performance for the guest user, relative to device performance during the operating of the electronic device prior to updating the guest physical model (e.g., as in the example of FIG. 6). In one or more implementations, when the guest user stops using the electronic device 105 and/or when the primary user is again detected by the authenticator 206 (e.g., using the stored biometric identifier of the primary user), the guest physical model can be deleted (e.g., automatically and without user input) from the electronic device.

In one or more implementations, a guest user account and/or a guest physical model may be provided with guest user preferences, which may include accessibility features for the guest user. Guest user preferences and/or accessibility features may include features such as font size preferences, sound recognition services, audio output of displayed text, audio modifications, screen reader features, hardware accessory features, sound recognition features, or the like. The guest user preferences and/or accessibility features may be input by the primary user and/or the guest user, in some examples.

For example, in one or more implementations, a primary user may set accessibility settings for a guest user. For example, a primary user may desire to have a significant enlargement to the visual experience of a guest user using the primary user's device, such as so that the primary user's visually impaired guest user can use the same device without having to establish that accessibility setting from scratch. This ability for the primary user to establish accessibility settings may also extend to prescription lenses, such that a primary user may input a particular prescription lens setting that is persisted across a guest user session and is presented to a guest user for selection upon the guest user beginning to use the device (e.g., by donning a wearable electronic device). In one example use case, a primary user of a device may set up prescription settings for a spouse, partner, or friend of the primary user to use the device during a guest user setting. In one or more implementations, the accessibility settings provided by the primary user may be used to inform a guest user model that is generated by the electronic device for the guest user. While the aforementioned examples extend to accessibility settings and models for gaze and visual experiences, a primary user may also be able to establish accessibility settings for a guest user that extend to other aspects of the user model. In another example use case, if a guest user of a primary user has impaired hand functions, the primary user may prime the electronic device (e.g., by setting appropriate user input settings) to know that hand models will play a limited (or no role) in that guest user's experience. These settings may inform the device to generate guest user models and to provide user input/output options and interpret user inputs accordingly. In another example use case, accessibility settings that may be set by a primary user for a guest user of an electronic device may also apply to certain postures or user orientations, for example users confined to seated positions due to physical limitations. In this example use case, the primary user of the electronic device may set one or more mobility settings for the guest user.

In one or more implementations, upon detection of the guest user by the electronic device 105, the electronic device 105 may provide one or more user preference and/or accessibility options that can be selectable by the guest user. As examples, the user preference options that may be presented to a primary user before a guest user uses the electronic device or to a guest user when the guest user begins using the electronic device may include one or more of a text/font size option, an audio description option, a sound recognition option, a captioning option, a screen reader option, a hardware accessory option, a prescription option, a mobility option, an eye model option, a hand model option, or the like. The accessibility features may provide enhanced access to the electronic device by the guest user during use by the guest user, may be (e.g., temporarily) stored as guest preferences in association with the guest user account (e.g., as illustrated in FIG. 7) while the guest user operates the electronic device, and may also be deleted from the electronic device (e.g., automatically and without user input) when the guest user stops using the electronic device. In this way, the privacy of the guest user can be protected.

Various examples are described herein in which updates to an initial guest physical model are generated during and based on operation of an electronic device by a guest user. It is also appreciated that, in one or more implementations, the electronic device may store a default physical model, and updates to the default physical model can be generated during and based on operation of an electronic device by a guest user, to generate and enhance the guest physical model.

Figure 8:
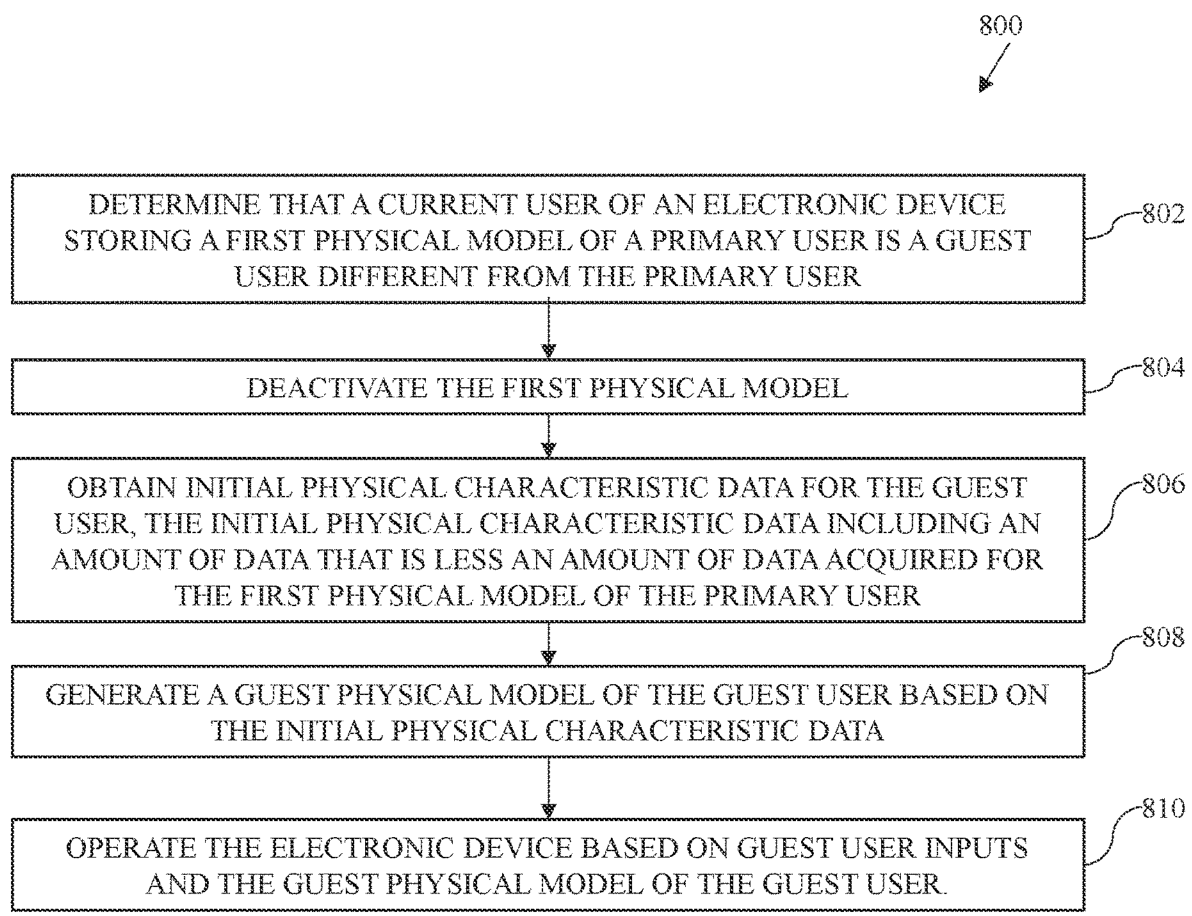
FIG. 8 illustrates a flow diagram of an example process for facilitating operation of an electronic device by a guest user according to aspects of the subject technology.

FIG. 8 illustrates a flow diagram of an example process for guest user operation of an electronic device of a primary user according to aspects of the subject technology. The blocks of process 800 are described herein as occurring in serial, or linearly. However, multiple blocks of process 800 may occur in parallel. In addition, the blocks of process 800 need not be performed in the order shown and/or one or more blocks of process 800 need not be performed and/or can be replaced by other operations. The process 800 is described, in some examples, in connection with the electronic device 105 of FIGS. 1-7. However, it is appreciated that the process 800 may be performed by other suitable device and/or systems.

In the example of FIG. 8, at block 802, an electronic device (e.g., electronic device 105) storing a first physical model of a primary user (e.g., an electronically stored model of one or more physical attributes of the primary user) may determine that a current user of the electronic device is a guest user different from the primary user. For example, determining that the current user is the guest user different from the primary user may include obtaining, by the electronic device (e.g., using camera(s) 150 and/or sensor(s) 152), a biometric input from the current user of the electronic device, and determining, by comparing the biometric input to a first biometric identifier of the primary user, that the current user is the guest user different from the primary user (e.g., as described above in connection with FIG. 5). In another example, determining that the current user is the guest user different from the primary user may include obtaining a user input (e.g., a selection of a guest option) from the primary user or the current user indicating that the current user is the guest user different from the primary user.

Responsive to determining that the current user is the guest user different from the primary user, at block 804, the electronic device may deactivate the first physical model (e.g., as described above in connection with FIG. 5). Deactivating the first physical model may include ceasing use of the first physical model by an I/O service of the electronic device (e.g., and deleting or unlinking the first physical model from an execution space of the I/O service).

At block 806, the electronic device may obtain (e.g., from sensor data from sensor(s) 152 and/or camera data from camera(s) 150) initial physical characteristic data for the guest user. The initial physical characteristic data may include an amount of data that is less than an amount of data acquired for the first physical model of the primary user (e.g., as described above in connection with FIG. 6). The initial physical characteristic data may include an initial image of the user's eye or eyes, and/or one or more initial images of the user's hand or hands, and/or other sensor data corresponding to physical characteristics of the guest user, such as obtained without providing enrollment instructions to the guest user and/or providing a reduced set of enrollment instructions to the guest user (e.g., relative to the enrollment instructions provided to the primary user in an enrollment process for the primary user).

At block 808, the electronic device may generate a guest physical model of the guest user based on the initial physical characteristic data (e.g., as described above in connection with FIG. 6). For example, the guest physical model of the guest user may be an initial guest user model, and may include a model of one or more physical features of the guest user, such as the guest user's eyes (e.g., including an interpupillary distance, pupil locations, or the like), the guest user's hands, the guest user's height, and/or other physical features. The initial guest physical model may have an uncertainty that is relatively higher than an uncertainty of the physical model of the primary user, due to the reduced amount of physical characteristic data used to generate the initial guest physical model. However, generating the initial guest physical model using the reduced data may help allow the guest user to begin immediately using the electronic device.

At block 810, the electronic device may operate based on guest user inputs and the guest physical model of the guest user (e.g., as described above in connection with FIG. 6). For example, operating the electronic device based on the guest user inputs and the guest physical model of the guest user may include interpreting the guest user inputs based on the guest physical model. As another example, operating the electronic device based on the guest user inputs and the guest physical model of the guest user may include generating an output (e.g., a guest user specific output, such as an audio output, a video output, a haptic output, a three-dimensional output, or other output) based on the guest physical model.

In one or more implementations, while operating the electronic device based on the guest user inputs and the guest physical model of the guest user, the electronic device (e.g., enrollment service 208) may extract additional physical characteristic data from the guest user inputs. In one or more implementations, the electronic device may update the guest physical model of the guest user based on the additional physical characteristic data. The electronic device may also operate, based on the updated guest physical model of the guest user (e.g., as described above in connection with FIG. 7), to provide enhanced device performance for the guest user, relative to device performance during the operating of the electronic device prior to updating the guest physical model (e.g., using the initial guest physical model generated at block 808).

In one or more implementations, (e.g., after operating the electronic device based on the guest physical model and/or the updated guest physical model), the electronic device may also determine (e.g., by comparing an additional biometric input to the first biometric identifier, or by receiving a user input indicating a user switch) that the current user has switched from the guest user (e.g., back) to the primary user. In one or more implementations, the electronic device may delete the guest physical model of the guest user and activate (e.g., re-activate) the first physical model of the primary user for operation of the electronic device.

Various examples are described herein in which a user other than the primary user is detected and an initial (e.g., coarse) enrollment operation allows the other user to immediately begin using the electronic device. In one or more of these examples, the initial enrollment operation for the guest user may be performed when a primary user authentication fails or when unexpected user activity is detected (e.g., a hand gesture is detected one or more times at a location near but not at a location of a displayed touch-interactive element). In one or more use cases, the unexpected user activity (or another input by the user or from another device or component) may indicate that an updated enrollment of the primary user should be performed.

As examples, a physical model of a primary user can become stale or outdated for various reasons. These reasons can include a change in a prescription (e.g., due to normal aging processes or for a singular event such as a corrective eye surgery) of eyewear (e.g., contact lenses, glasses lenses, or lenses that clip onto the electronic device 105) of the primary user that affects gaze-based operations and/or eye-based authentication operations, or may include physical changes in the user's appearance (e.g., due to a surgery or due to growth of a child user over time).

In one or more implementations, the re-enrollment of a previously enrolled user can be triggered by the user (e.g., by indicating a prescription change to the electronic device or by requesting re-enrollment), triggered by another device or component (e.g., the user may change a set of clip-on lenses for the electronic device, and the electronic device can detect the new clip-on lenses, such as via a radio-frequency identifier (RFID) or near-filed communications (NFC) element on the clip-on lenses), or triggered by a detection of unexpected user activity. In one or more implementations, the electronic device 105 can update an existing physical model for the enrolled user when a prescription change is indicated or detected (e.g., when a first set of prescription clip-on lenses with a first prescription is changed to a second set of prescription clip-on lenses with a second prescription) or a new physical model may be generated for the enrolled (e.g., when a change in appearance occurs, and/or when a change from contact lenses to clip-on lenses or from clip-on lenses to contact lenses occurs). In one or more implementations, the electronic device 105 may perform an updated enrollment of a previously enrolled user when a change in physical appearance is indicated by the user or detected by the electronic device.

Figure 9:
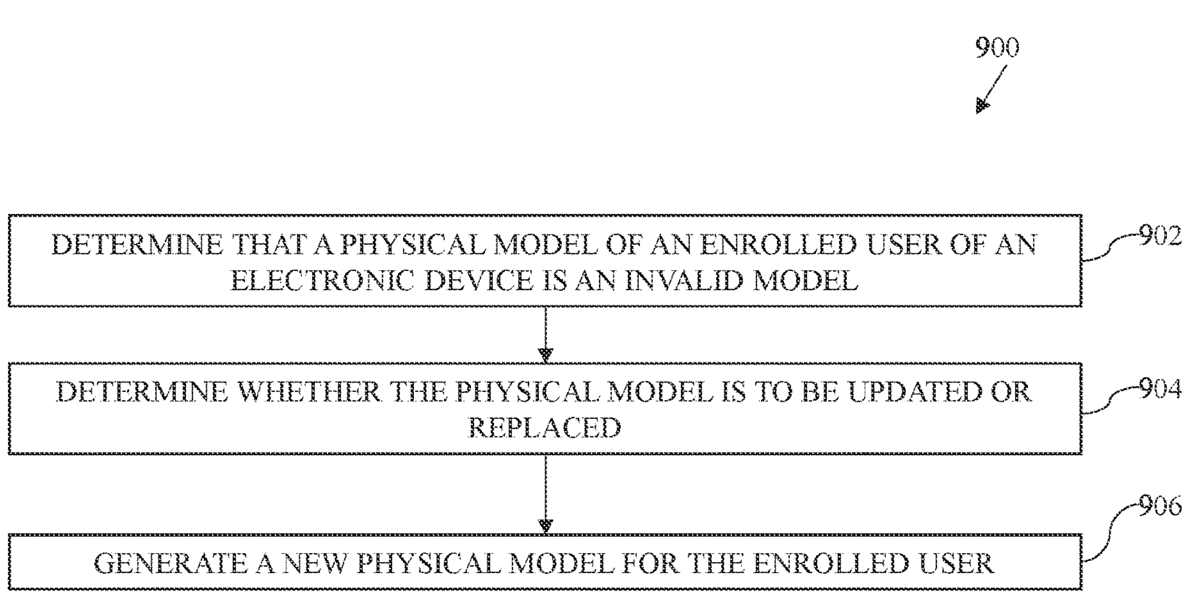
FIG. 9 illustrates a flow diagram of an example process for updating a physical model of a primary user according to aspects of the subject technology.

FIG. 9 illustrates a flow diagram of an example process for updating an enrollment of a previously enrolled user of an electronic device according to aspects of the subject technology. The blocks of process 900 are described herein as occurring in serial, or linearly. However, multiple blocks of process 900 may occur in parallel. In addition, the blocks of process 900 need not be performed in the order shown and/or one or more blocks of process 900 need not be performed and/or can be replaced by other operations. The process 900 is described, in some examples, in connection with the electronic device 105 of FIGS. 1-7. However, it is appreciated that the process 900 may be performed by other suitable device and/or systems.

In the example of FIG. 9, at block 902, an electronic device such as electronic device 105 may determine that a physical model of an enrolled user of an electronic device is an invalid model. For example, the enrolled user may be a primary user of the electronic device. For example, the physical model may be an invalid model due to a physical change associated with the enrolled user (e.g., a change in eyewear prescription, a surgery, or growth of a child). In one or more implementations, the electronic device may determine that the physical model of the enrolled user of an electronic device is an invalid model based on user input from the enrolled user requesting an updated enrollment. In one or more implementations, the electronic device may determine that the physical model of the enrolled user of the electronic device is an invalid model based on an interaction with another device or component. For example, a set of prescription lenses that is clipped to the electronic device may be removed and replaced with another set of prescription lenses. In one or more implementations, the sets of prescription lenses may include RFIDs or other electronic identifiers that can be detected by the electronic device, and the electronic device can detect the change in the sets of prescription lenses. In one or more other implementations the user may input a new prescription of the new set of prescription lenses. In one or more implementations, the electronic device may determine that the physical model of the enrolled user of the electronic device is an invalid model based on one or more unexpected user interactions (e.g., based on user gaze locations and user hand gestures that are repeatedly misaligned).

At block 904, the electronic device may determine (e.g., responsive to determining that the physical model of the enrolled user of the electronic device is an invalid model) whether the physical model is to be updated or replaced. For example, the electronic device may determine that the physical model of the enrolled user can be updated based on a known prescription change, when the physical model is invalid due only to a prescription change in a same type of eyewear (e.g., different prescription clip-on lenses, different prescription glasses, or different prescription contact lenses). As another example, the electronic device may determine that the physical model of the enrolled user is to be replaced when the physical model is invalid due to a change in appearance (e.g., growth of a child, or a surgery) or due to a change in a type of eyewear (e.g., glasses to contact lenses, contact lenses to glasses, clip-on lenses to contact lenses, clip-on lenses to glasses, glasses to clip-on lenses, or contact lenses to clip-on lenses).

At block 906, the electronic device may generate a new physical model for the enrolled user (e.g., based on the determining whether the physical model is to be updated or replaced). For example, if it is determined (at block 904) that the physical model can be updated, the electronic device may generate the new physical model by updating the previously enrolled physical model. As another example, if it is determined (at block 904) that the physical model is to be replaced, the electronic device may perform a new enrollment operation (e.g., as described above in connection with FIG. 4), and generate the new physical model by replacing the previously enrolled physical model with the new physical module based on the new enrollment operation.

Figure 10:
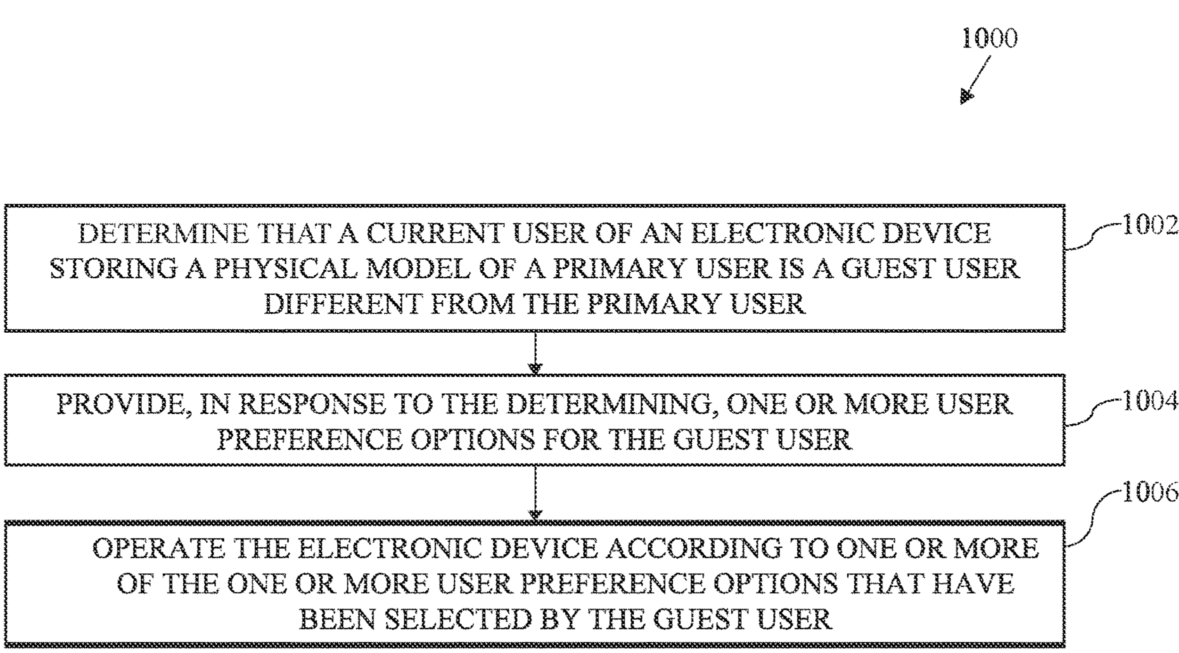
FIG. 10 illustrates a flow diagram of another example process for facilitating operation of an electronic device by a guest user according to aspects of the subject technology.

FIG. 10 illustrates a flow diagram of an example process for operation of an electronic device by a guest user, according to aspects of the subject technology. The blocks of process 1000 are described herein as occurring in serial, or linearly. However, multiple blocks of process 1000 may occur in parallel. In addition, the blocks of process 1000 need not be performed in the order shown and/or one or more blocks of process 1000 need not be performed and/or can be replaced by other operations. The process 1000 is described, in some examples, in connection with the electronic device 105 of FIGS. 1-7. However, it is appreciated that the process 1000 may be performed by other suitable device and/or systems.

In the example of FIG. 10, at block 1002, an electronic device (e.g., electronic device 105) storing a first physical model of a primary user may determine that a current user of the electronic device is a guest user different from the primary user. For example, determining that the current user is the guest user different from the primary user may include obtaining, by the electronic device (e.g., using camera(s) 150 and/or sensor(s) 152), a biometric input from the current user of the electronic device, and determining, by comparing the biometric input to a first biometric identifier of the primary user, that the current user is the guest user different from the primary user (e.g., as described above in connection with FIG. 5). In another example, determining that the current user is the guest user different from the primary user may include obtaining a user input (e.g., a selection of a guest option) from the primary user or the current user indicating that the current user is the guest user different from the primary user.

At block 1004, the electronic device may provide, in response to the determining, one or more user preference options for the guest user. As examples, the user preference options may be provided as selectable options that are presented to the guest user in a drop down menu, as an audio list, or in any other form in which the guest user can select one or more of the one or more user preference options. As illustrative examples, the one or more user preference options may include one or more of a text size option, an audio description option, a sound recognition option, a captioning option, a screen reader option or a hardware accessory option. It is also appreciated that the electronic device may also one or more user preference options, for the guest user, to a primary user prior to the guest user becoming the current user. As described herein, user preference options that may be selectable by a primary user and/or a guest user can include accessibility settings such as prescription settings, visual experience settings, gesture-related input settings, mobility settings, or the like.

At block 1006, the electronic device may be operated, while the current user is the guest user, according to one or more of the one or more user preference options that have been selected by the guest user. In one or more implementations, the electronic device may also store the one or more of the one or more user preference options selected by the guest user in association with a guest user account for the guest user at the electronic device (e.g., as illustrated in FIG. 7).

In one or more implementations, the process 1000 may also include, responsive to the determining: deactivating the first physical model; obtaining initial physical characteristic data for the guest user, the initial physical characteristic data including an amount of data that is less than an amount of data acquired for the first physical model of the primary user; generating a guest physical model of the guest user based on the initial physical characteristic data; and/or operating the electronic device based on guest user inputs, the one or more of the one or more user preference options that have been selected by the guest user, and the guest physical model of the guest user.

In one or more implementations, the electronic device may also determine that the current user has switched from the guest user to the primary user, and may delete the guest user account and the one or more of the one or more user preference options selected by the guest user.

As described above, aspects of the subject technology may include the collection of data. The present disclosure contemplates that in some instances, this collected data may include personal information data that uniquely identifies or can be used to identify a specific person. Such personal information data can include physical characteristic data, physical model data, demographic data, location-based data, online identifiers, telephone numbers, email addresses, home addresses data, image data, audio data, environment data, or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used for generating a primary user physical model or a guest user physical model and/or for operating an electronic device based on user-specific inputs and/or based on the primary user physical model or the guest user physical model. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates implementations in which users selectively block the use of, or access to, personal information data. That is, the present disclosure contemplates that hardware and/or software elements can be provided to prevent or block access to such personal information data. For example, in the case of generating a primary user physical model or a guest user physical model and/or for operating an electronic device based on user-specific inputs and/or based on the primary user physical model or the guest user physical model, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 11:
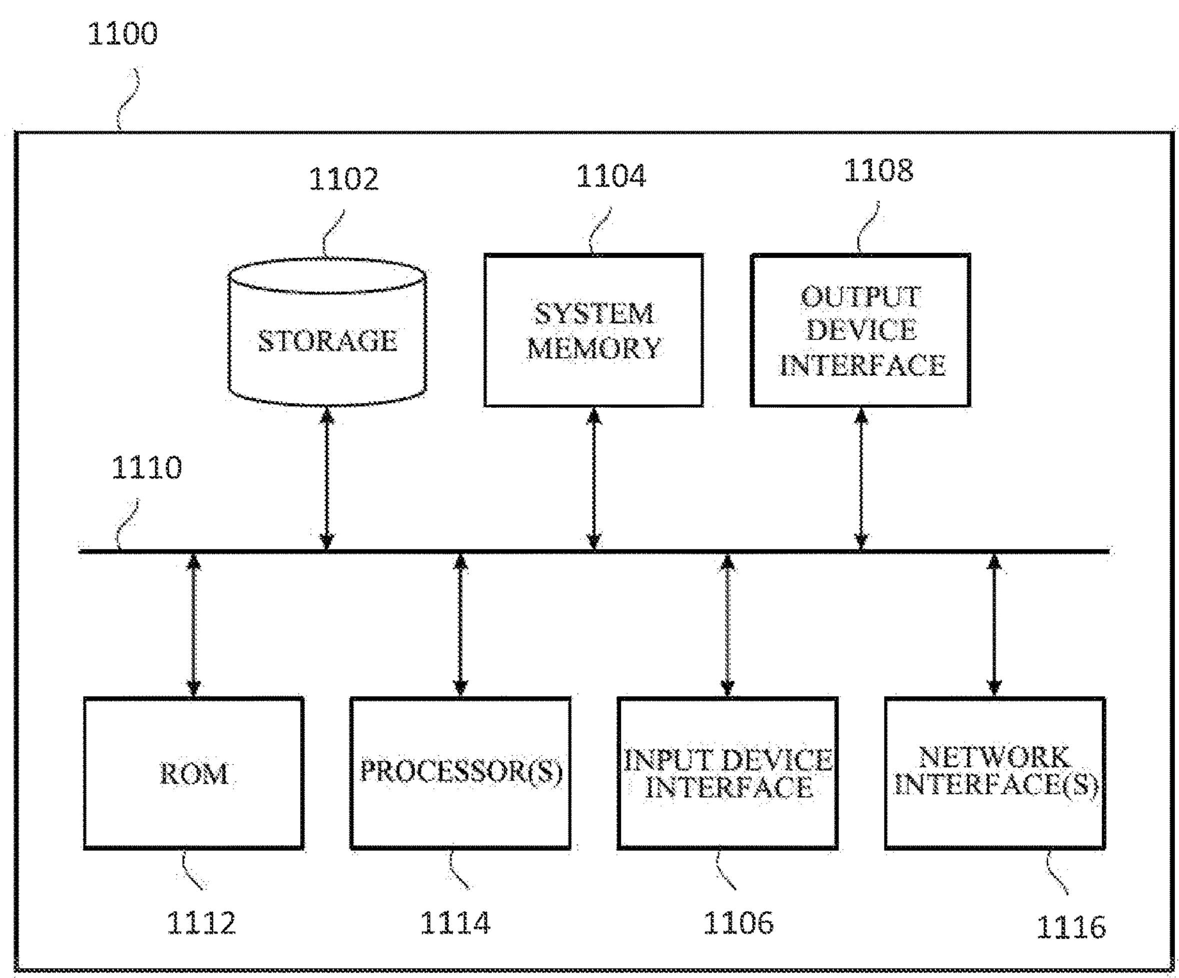
FIG. 11 illustrates an example computing device with which aspects of the subject technology may be implemented.

FIG. 11 illustrates an example computing device with which aspects of the subject technology may be implemented in accordance with one or more implementations. The computing device 1100 can be, and/or can be a part of, any computing device or server for generating the features and processes described above, including but not limited to a laptop computer, a smartphone, a tablet device, a wearable device such as a goggles or glasses, and the like. The computing device 1100 may include various types of computer readable media and interfaces for various other types of computer readable media. The computing device 1100 includes a permanent storage device 1102, a system memory 1104 (and/or buffer), an input device interface 1106, an output device interface 1108, a bus 1110, a ROM 1112, one or more processing unit(s) 1114, one or more network interface(s) 1116, and/or subsets and variations thereof.

The bus 1110 collectively represents all system, peripheral, and chipset buses that communicatively connect the numerous internal devices of the computing device 1100. In one or more implementations, the bus 1110 communicatively connects the one or more processing unit(s) 1114 with the ROM 1112, the system memory 1104, and the permanent storage device 1102. From these various memory units, the one or more processing unit(s) 1114 retrieves instructions to execute and data to process in order to execute the processes of the subject disclosure. The one or more processing unit(s) 1114 can be a single processor or a multi-core processor in different implementations.

The ROM 1112 stores static data and instructions that are needed by the one or more processing unit(s) 1114 and other modules of the computing device 1100. The permanent storage device 1102, on the other hand, may be a read-and-write memory device. The permanent storage device 1102 may be a non-volatile memory unit that stores instructions and data even when the computing device 1100 is off. In one or more implementations, a mass-storage device (such as a magnetic or optical disk and its corresponding disk drive) may be used as the permanent storage device 1102.

In one or more implementations, a removable storage device (such as a floppy disk, flash drive, and its corresponding disk drive) may be used as the permanent storage device 1102. Like the permanent storage device 1102, the system memory 1104 may be a read-and-write memory device. However, unlike the permanent storage device 1102, the system memory 1104 may be a volatile read-and-write memory, such as random access memory. The system memory 1104 may store any of the instructions and data that one or more processing unit(s) 1114 may need at runtime. In one or more implementations, the processes of the subject disclosure are stored in the system memory 1104, the permanent storage device 1102, and/or the ROM 1112. From these various memory units, the one or more processing unit(s) 1114 retrieves instructions to execute and data to process in order to execute the processes of one or more implementations.

The bus 1110 also connects to the input and output device interfaces 1106 and 1108. The input device interface 1106 enables a user to communicate information and select commands to the computing device 1100. Input devices that may be used with the input device interface 1106 may include, for example, alphanumeric keyboards and pointing devices (also called "cursor control devices"). The output device interface 1108 may enable, for example, the display of images generated by computing device 1100. Output devices that may be used with the output device interface 1108 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information.

One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 11, the bus 1110 also couples the computing device 1100 to one or more networks and/or to one or more network nodes through the one or more network interface(s) 1116. In this manner, the computing device 1100 can be a part of a network of computers (such as a LAN, a wide area network ("WAN"), or an Intranet, or a network of networks, such as the Internet. Any or all components of the computing device 1100 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components (e.g., computer program products) and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:

by an electronic device storing:

a user account of a primary user, authentication data for identification of the primary user, and a first physical model that describes physical attributes, different from the authentication data, of the primary user, the physical attributes including multiple attributes of the eyes of the primary user, determining, using the authentication data, that a current user of the electronic device is a guest user different from the primary user; and responsive to the determining:

deactivating the first physical model by discontinuing use of the physical attributes of the primary user by the electronic device;

obtaining, without obtaining authentication data for identification of the guest user, initial physical characteristic data for the guest user, the initial physical characteristic data including an amount of attributes of the eyes of the guest user that is less than an amount of the multiple attributes of the eyes of the primary user;

generating a guest physical model of physical attributes of the guest user based on the initial physical characteristic data; and operating a display of the electronic device based on guest user inputs and the attributes of the eyes of the guest user in the guest physical model of the guest user.

2. The method of claim 1, further comprising, while operating the display of the electronic device based on the guest user inputs and the attributes of the eyes of the guest user, extracting additional physical characteristic data from the guest user inputs.

3. The method of claim 2, further comprising:

updating the guest physical model of the guest user based on the additional physical characteristic data; and operating the electronic device, based on the updated guest physical model of the guest user, to provide enhanced device performance for the guest user, relative to device performance during the operating of the electronic device prior to updating the guest physical model.

4. The method of claim 1, wherein determining that the current user is the guest user different from the primary user comprises:

obtaining, by the electronic device, a biometric input from the current user of the electronic device; and determining, by comparing the biometric input to the authentication data for the primary user, that the current user is the guest user different from the primary user.

5. The method of claim 4, further comprising determining, by comparing an additional biometric input to the authentication data, that the current user has switched from the guest user to the primary user.

6. The method of claim 5, further comprising deleting the guest physical model of the guest user and activating the first physical model of the primary user for operation of the electronic device using the physical attributes of the primary user.

7. The method of claim 1, further comprising operating the electronic device based on the guest user inputs and the guest physical model of the guest user by:

obtaining sensor data with a sensor of the electronic device; and identifying a user input to the electronic device from the guest user by interpreting the sensor data based on the guest physical model.

8. The method of claim 7, wherein the sensor comprises one or more cameras, wherein the sensor data comprises an image of an eye of the guest user and an image of a hand of the guest user, and wherein identifying the user input to the electronic device from the guest user comprises at least one of:

determining a gaze location of the guest user by interpreting the image of the eye of the guest user based on the attributes of the eyes of the guest user as described in the guest physical model, or identifying a hand gesture performed by the guest user by interpreting the image of the hand of the guest user based on features of the hands of the guest user as described in the guest physical model.

9. The method of claim 1, wherein the attributes of the eyes of the guest user at least an interpupillary distance, and wherein operating the display of the electronic device based on the attributes of the eyes of the guest user comprises displaying left eye display frames and right eye display frames at locations that cause display content on the display to appear at a desired three-dimensional depth to the guest user, based on the interpupillary distance.

10. A device, comprising:

a memory storing:

a user account of a primary user, authentication data for identification of the primary user, and a first physical model that describes physical attributes, different from the authentication data, of the primary user, the physical attributes including multiple attributes of the eyes of the primary user; and one or more processors configured to:

determine, using the authentication data, that a current user of the device is a guest user different from the primary user; and responsive to determining that the current user of the device is the guest user different from the primary user:

deactivate the first physical model by discontinuing use of the physical attributes of the primary user by the device;

obtain, without obtaining authentication data for identification of the guest user, initial physical characteristic data for the guest user, the initial physical characteristic data including an amount of attributes of the eyes of the guest user that is less than an amount of the multiple attributes of the eyes of the primary user;

generate a guest physical model of physical attributes of the guest user based on the initial physical characteristic data; and operate a display of the device based on guest user inputs and the attributes of the eyes of the guest user in the guest physical model of the guest user.

11. The device of claim 10, wherein the one or more processors are further configured to, while operating the display of the device based on the guest user inputs and the attributes of the eyes of the guest user, extract additional physical characteristic data from the guest user inputs.

12. The device of claim 11, wherein the one or more processors are further configured to:

update the guest physical model of the guest user based on the additional physical characteristic data; and operate the device, based on the updated guest physical model of the guest user, to provide enhanced device performance for the guest user, relative to device performance during the operating of the device prior to updating the guest physical model.

13. The device of claim 10, wherein the one or more processors are configured to determine that the current user is the guest user different from the primary user by:

obtaining a biometric input from the current user of the device; and determining, by comparing the biometric input to the authentication data for the primary user, that the current user is the guest user different from the primary user.

14. The device of claim 13, wherein the one or more processors are further configured to determine, based on a comparison of an additional biometric input with the authentication data, that the current user has switched from the guest user to the primary user.

15. The device of claim 14, wherein the one or more processors are further configured to delete the guest physical model of the guest user and activate the first physical model of the primary user for operation of the device using the physical attributes of the primary user.

16. The device of claim 10, wherein the one or more processors are further configured to operate the device based on the guest user inputs and the guest physical model of the guest user by interpreting sensor data corresponding to the guest user inputs based on the guest physical model to generate user input signals to the device from the guest user.

17. The device of claim 16, wherein the one or more processors are further configured to operate the device based on the guest user inputs and the guest physical model of the guest user by generating an output from the device for the guest user based on the guest physical model.

18. A non-transitory computer-readable medium storing instructions which, when executed by one or more processors, cause the one or more processors to perform operations including:

by an electronic device storing:

a user account of a primary user, biometric data for identification of the primary user, and a first physical model that describes physical attributes, different from the biometric data, of the primary user, the physical attributes including multiple attributes of the eyes of the primary user;

determining, using the biometric data, that a current user of the electronic device is a guest user different from the primary user; and responsive to the determining:

deactivating the first physical model by discontinuing use of the physical attributes of the primary user by the electronic device;

obtaining, without obtaining biometric data for identification of the guest user, initial physical characteristic data for the guest user, the initial physical characteristic data including an amount of attributes of the eyes of the guest user that is less than an amount of the multiple attributes of the eyes of the primary user;

generating a guest physical model of physical attributes of the guest user based on the initial physical characteristic data; and operating a display of the electronic device based on guest user inputs and the attributes of the eyes of the guest user in the guest physical model of the guest user.

19. The non-transitory computer-readable medium of claim 18, wherein the operations further comprise, while operating the display of the electronic device based on the guest user inputs and the attributes of the eyes of the guest user, extracting additional physical characteristic data from the guest user inputs.

20. The non-transitory computer-readable medium of claim 19, wherein the operations further comprise:

updating the guest physical model of the guest user based on the additional physical characteristic data; and operating the electronic device, based on the updated guest physical model of the guest user, to provide enhanced device performance for the guest user, relative to device performance during the operating of the electronic device prior to updating the guest physical model.

21. The non-transitory computer-readable medium of claim 18, wherein the operations further comprise:

interpreting sensor data corresponding to the guest user inputs based on additional physical attributes of the guest user in the guest physical model.

22. A method, comprising:

by an electronic device storing:

a user account of a primary user, authentication data for identification of the primary user, and a first physical model that describes physical attributes, different from the authentication data, of the primary user, the physical attributes of the primary user including multiple attributes of the eyes of the primary user, determining, using the authentication data, that a current user of the electronic device is a guest user different from the primary user; and responsive to the determining:

deactivating the first physical model by discontinuing use of the physical attributes of the primary user by the electronic device;

providing, by the electronic device, one or more user preference options for the guest user;

generating, without obtaining authentication data for identification of the guest user, a guest physical model of physical attributes of the guest user, the physical attributes of the guest user including an amount of attributes of the eyes of the guest user that is less than an amount of the multiple attributes of the eyes of the primary user; and operating a display of the electronic device, while the current user is the guest user, according to the attributes of the eyes of the guest user in the guest physical model and one or more of the one or more user preference options that have been selected by the guest user.

23. The method of claim 22, further comprising storing the one or more of the one or more user preference options selected by the guest user in association with a guest user account for the guest user at the electronic device.

24. The method of claim 23, further comprising:

determining, by the electronic device, that the current user has switched from the guest user to the primary user; and deleting the guest user account and the one or more of the one or more user preference options selected by the guest user.

25. The method of claim 22, wherein the one or more user preference options include one or more of a text size option, an audio description option, a sound recognition option, a captioning option, a screen reader option or a hardware accessory option.

* * * * *